United States Patent
Fletcher et al.

(10) Patent No.: US 9,238,388 B2
(45) Date of Patent: Jan. 19, 2016

(54) TIRE PRESSURE MAINTENANCE APPARATUS AND SYSTEM

(71) Applicants: David Fletcher, Flint, MI (US); James Miller, Ortonville, MI (US); Craig Markyvech, Romulus, MI (US); Brian Graichen, Royal Oak, MI (US)

(72) Inventors: David Fletcher, Flint, MI (US); James Miller, Ortonville, MI (US); Craig Markyvech, Romulus, MI (US); Brian Graichen, Royal Oak, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 274 days.

(21) Appl. No.: 13/844,155

(22) Filed: Mar. 15, 2013

(65) Prior Publication Data
US 2014/0261942 A1    Sep. 18, 2014

(51) Int. Cl.
*B60C 23/12* (2006.01)
*B60C 23/00* (2006.01)

(52) U.S. Cl.
CPC .................................. *B60C 23/004* (2013.01)

(58) Field of Classification Search
CPC ..... B60C 23/001; B60C 23/004; B60C 23/12; B60C 23/10
USPC ................................................. 152/415, 418
See application file for complete search history.

(56) References Cited

U.S. PATENT DOCUMENTS

| 4,008,743 | A | * | 2/1977 | Welch | 152/158 |
|---|---|---|---|---|---|
| 4,418,737 | A | | 12/1983 | Goodell et al. | |
| 4,619,303 | A | | 10/1986 | Bryan et al. | |
| 4,640,331 | A | | 2/1987 | Braun et al. | |
| 4,724,879 | A | | 2/1988 | Schultz et al. | |
| 4,744,399 | A | | 5/1988 | Magnusen et al. | |
| 4,754,792 | A | | 7/1988 | Braun et al. | |
| 4,924,926 | A | | 5/1990 | Schultz et al. | |
| 5,325,902 | A | | 7/1994 | Loewe et al. | |
| 5,327,346 | A | | 7/1994 | Goodell | |
| 5,355,924 | A | | 10/1994 | Olney | |
| 5,429,167 | A | | 7/1995 | Jensen | |
| 5,591,281 | A | | 1/1997 | Loewe | |
| 5,975,174 | A | | 11/1999 | Loewe | |
| 6,144,295 | A | | 11/2000 | Adams et al. | |
| 6,269,691 | B1 | | 8/2001 | Sowatzke et al. | |
| 6,601,625 | B2 | | 8/2003 | Rheinhardt | |
| 7,290,577 | B2 | * | 11/2007 | Rumbaugh | 152/153 |
| 7,530,379 | B1 | * | 5/2009 | Becker et al. | 152/415 |
| 8,360,121 | B2 | | 1/2013 | Caretta et al. | |
| 2005/0109439 | A1 | * | 5/2005 | Droegemueller | 152/519 |
| 2006/0201598 | A1 | * | 9/2006 | Rheinhardt et al. | 152/418 |
| 2010/0300591 | A1 | | 12/2010 | Rheinhardt | |

OTHER PUBLICATIONS

PCT, International Search Report and Written Opinion, PCT/US2014/020715 (Jun. 25, 2014).

* cited by examiner

*Primary Examiner* — S. Joseph Morano
*Assistant Examiner* — Jean Charleston
(74) *Attorney, Agent, or Firm* — Thompson Hine LLP

(57) ABSTRACT

A tire pressure maintenance apparatus and system is disclosed. The apparatus and system comprises a high pressure reservoir and a pressure regulator secured to the high pressure reservoir. A high pressure relief valve is also provided. The high pressure reservoir is circumferentially continuous. Further, the pressure regulator has a passive valve in fluid communication with the high pressure reservoir and the pressure regulator opens at a low pressure point and closes at a high pressure point.

20 Claims, 5 Drawing Sheets

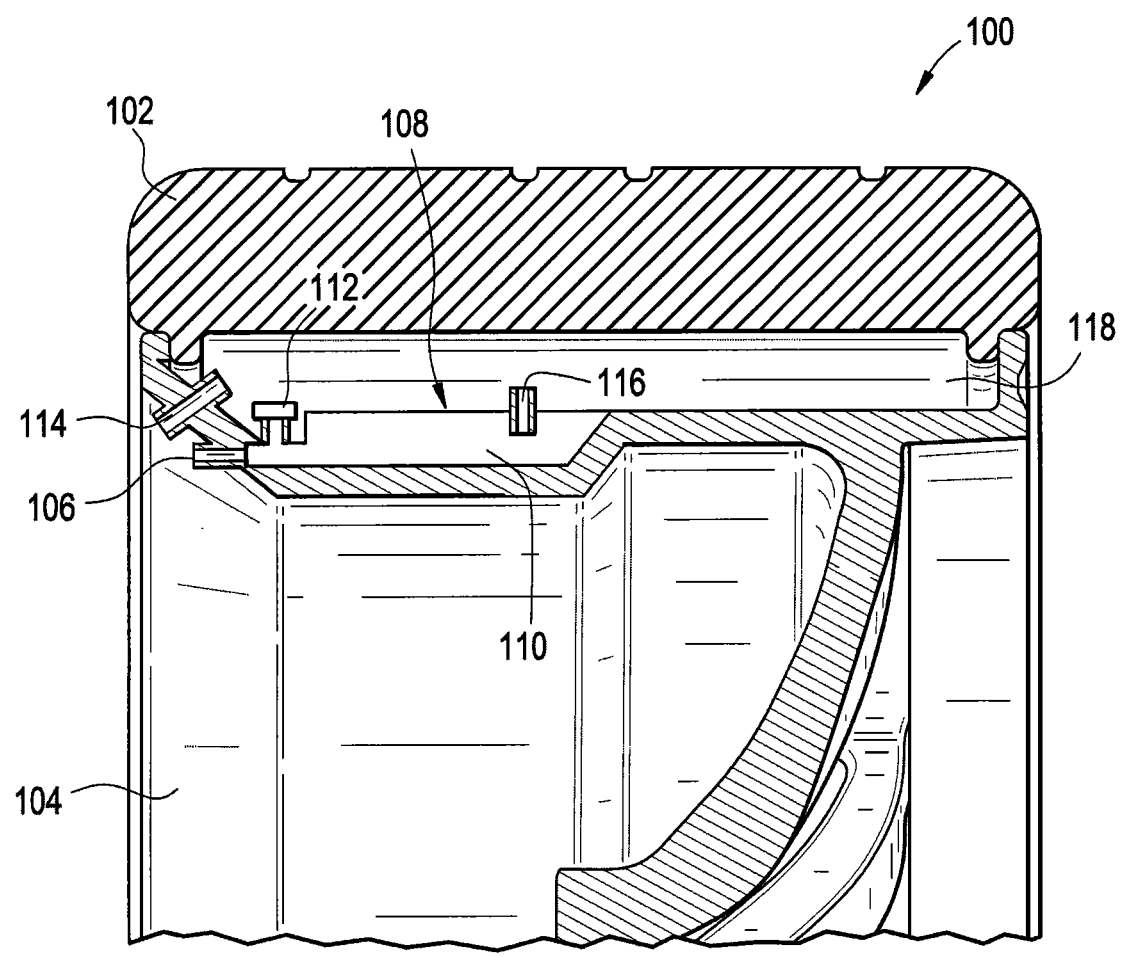

TIRE PRESSURE MAINTENANCE APPARATUS AND SYSTEM

TECHNICAL FIELD

The present application relates generally to a tire pressure maintenance apparatus and system and more particularly to a passive tire pressure maintenance apparatus and, system.

BACKGROUND

There are estimates that 50% of passenger vehicles are driven on underinflated tire assemblies. Although tires are usually properly inflated when installed, tires lose air pressure over time due to tire material aging issues and changing external conditions, including but not limited to temperature. Tire air pressure loss does not only present safety issues, but may cause accelerated tire wear, decreased fuel efficiency, and increased pollution. Studies have shown properly maintained air pressure of vehicle tire assemblies would save millions of gallons of fuel each year because vehicles with underinflated tires lose on average 0.5-1.0 miles per gallon in fuel efficiency.

The aforementioned underinflated tire assemblies are not ideal and risk a series of safety issues and economic inefficiencies. Accordingly, a new tire pressure maintenance apparatus and system is desired.

SUMMARY

In one aspect, an automatic tire inflation system is disclosed that includes a high pressure reservoir, at least one pressure regulator, an inlet valve, and a high pressure relief valve. The high pressure relief valve is secured to the high pressure reservoir. Further, the at least one pressure regulator is secured to the high pressure reservoir, and the at least one pressure regulator has a passive valve in fluid communication with the high pressure reservoir. The inlet valve has a receiving end and a dispensing end, wherein the inlet valve is adapted to be in fluid communication with the high pressure reservoir.

In another aspect, a tire assembly is disclosed that includes a tire connected to a wheel rim, forming a tire cavity. Further, a high pressure reservoir is secured to the wheel rim, a pressure regulator is secured to the high pressure reservoir, and an inlet valve is connected to the high pressure reservoir and connected to the wheel rim. The pressure regulator has a passive valve with a first passageway in fluid communication with the high pressure reservoir and a second passageway in fluid communication with the tire cavity, and wherein the pressure regulator has a third passageway in fluid communication with atmospheric pressure.

In yet another aspect, a tire pressure maintenance apparatus is disclosed that includes a high pressure reservoir, a pressure regulator secured to the high pressure reservoir, and a high pressure relief valve secured to the high pressure reservoir. Further, the pressure regulator has a passive valve in fluid communication with the high pressure reservoir and the pressure regulator is set to open at a low pressure point and close at a first high pressure point.

BRIEF DESCRIPTION OF THE DRAWINGS

The above and other features of the invention, its nature and various advantages will be more apparent upon consideration of the following detailed description, taken in conjunction with the accompanying drawings.

FIG. 5 is a partial cross-section of a tire assembly having another embodiment of a tire pressure maintenance apparatus and system.

DETAILED DESCRIPTION

Figure 1:
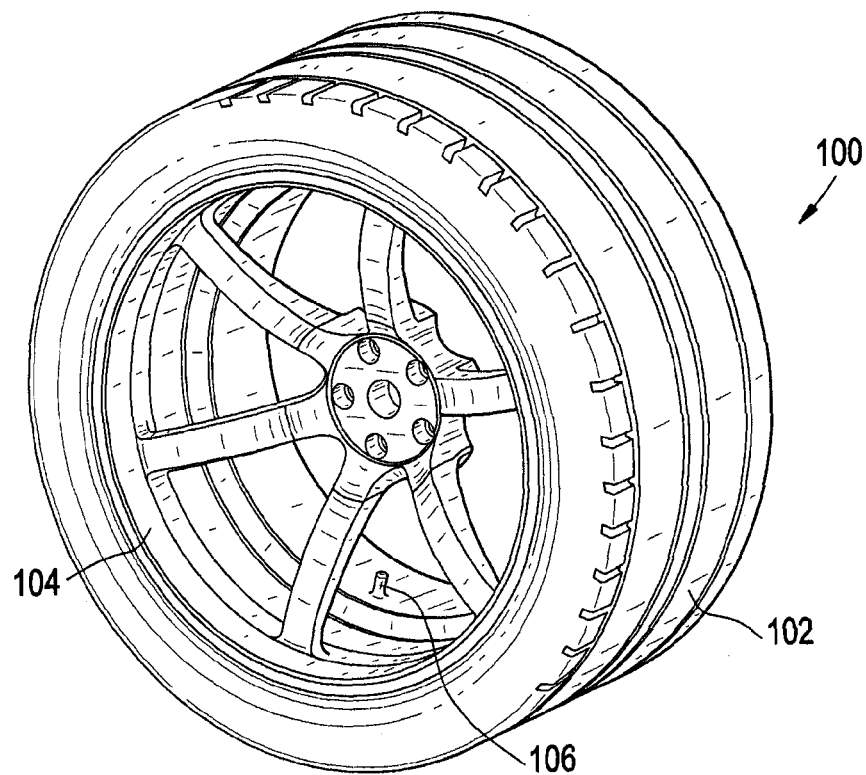
FIG. 1 is an isometric view of a tire assembly.

The following detailed description will illustrate the general principles of the invention, examples of which are additionally illustrated in the accompanying drawings. In the drawings, like reference numbers indicate identical or functionally similar elements.

FIG. 1 illustrates an isometric view of tire assembly 100. Tire assembly 100 includes a tire 102 and a wheel rim 104, e.g., a hub, having an air inlet valve 106. The tire 102 in FIG. 1, and in other embodiments discussed herein, may be any pneumatic tire, including but not limited to passenger vehicle tires, truck tires including over the road and off road truck tires, tractor and construction vehicle tires, airplane tires, and the like. Similarly, wheel rim 104 in FIG. 1, and in other embodiments discussed herein, may be any type of wheel rim, including but not limited to wheel rims that correspond to the pneumatic tires discussed herein.

Figure 2:
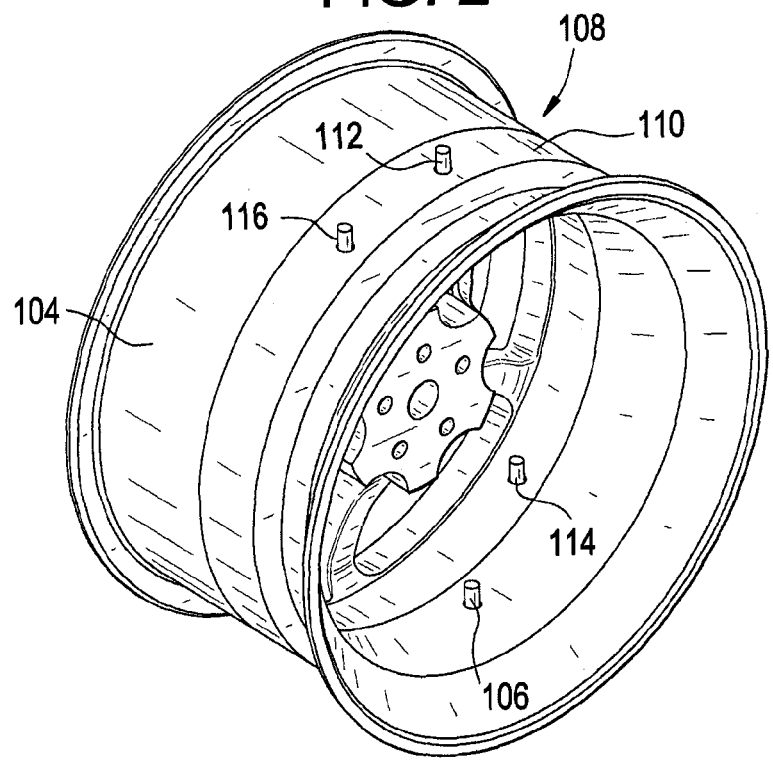
FIG. 2 is an isometric view of a wheel rim having a tire pressure maintenance apparatus and system.

FIG. 2 illustrates an isometric view of wheel rim 104 having a tire pressure maintenance apparatus and system 108 that includes air inlet valve 106, high pressure reservoir 110, pressure regulator 112, safety relief valve 114, and high pressure relief valve 116. In the illustrated embodiment, air inlet valve 106 is securely and fluidly connected to high pressure reservoir 110. When tire pressure maintenance apparatus and system 108 is assembled with tire assembly 100, the air inlet valve is securely connected to wheel rim 104. Air inlet valve 106 may be a Schrader valve or another valve that is used to supply and refill high pressure reservoir 110 with air or another gas, including but not limited to nitrogen gas, other inert gases, and the like. In another embodiment, a tire assembly may include a second air inlet valve that supplies air directly into the tire cavity.

In the illustrated embodiment, high pressure reservoir 110 is a circumferentially continuous reservoir that laterally spans at least a lateral portion of rim 104. In another embodiment, the high pressure reservoir may have at least one of the following configurations: a pressure bladder with a reinforced housing (similar to a reinforced hose), an inner tube like structure contained in a reinforced structure, a reservoir integral with the wheel rim, a pressure bladder having an internal, external, and/or integral reinforcement, and a reservoir having a spring tension structure that secures the reservoir to the wheel rim. In another embodiment, the high pressure reservoir may be designed as two or more reservoirs that are fluidly connected and that are spaced circumferentially and/or laterally about the rim. In yet another embodiment, the high pressure reservoir may be designed as two or more components or reservoirs that are coupled together with fasteners and a high pressure gasket. In yet another embodiment, the high pressure reservoir may be assembled or securely connected to an outside portion of the wheel rim, e.g., the curb side of a wheel rim wherein the high pressure reservoir may be configured to be aesthetically appealing. In another embodiment, the high pressure reservoir is one or more components that may be integral to the wheel rim or may be an assembly so it may be securely connected or securely assembled to the wheel rim.

Based on the tire assembly application, high pressure reservoir 110 is designed and made of materials capable of containing compressed air or gas ranging in pressure from 10-1000 pounds per square inch ("p.s.i."). For example, passenger tires may be rated for about 44 p.s.i., over the road truck tires may be rated for about 90 p.s.i., and tractor tires may be rated for about 14 p.s.i, so high pressure reservoir is designed for different tire assembly applications. The high pressure reservoir 110 may be made of metals, including but not limited to aluminum, steel, metal alloys, and the like, rubber and reinforcing nylons or metals, high strength plastics, braided fiberglass and rubber, braided steel and rubber, weaved materials and rubber, and the like. Further, the volume of high pressure reservoir 110 is designed to fit in a tire assembly cavity having a specified volume, i.e., the design and configuration of the high pressure reservoir considers the available volume in a tire assembly or area on a surface of the wheel rim as discussed further herein. In another embodiment, the high pressure reservoir is designed and made of materials capable of containing compressed air or gas ranging in pressure from one of the following ranges: 25-125 p.s.i., 50-150 p.s.i., 50-100 p.s.i., 75-125 p.s.i., 10-50 p.s.i., 20-100 p.s.i., 25-125 p.s.i., 50-100 p.s.i., 50-150 p.s.i., 100-200 p.s.i., 200-400 p.s.i., 400-600 p.s.i., 600-800 p.s.i., 800-1000 p.s.i., 500-1000 p.s.i., and the like.

FIG. 2 further illustrates at least one pressure regulator 112 securely connected to at least one location of high pressure reservoir 110 and in fluid communication with the same. Pressure regulator 112 controls flow of fluid (gas) by opening its valve or valve assembly at a low pressure set point and closing the valve at a high pressure set point. In another embodiment, the high pressure reservoir may include more than one pressure regulator. In the illustrated embodiment, the pressure regulator 112 is securely connected to an outer radial portion of the high pressure reservoir 110 and fluidly connects the high pressure reservoir 112 with the tire cavity 118. In another embodiment, the pressure regulator may be securely connected to a lateral end of the reservoir or another portion of the reservoir. Further referring to FIG. 2, high pressure relief valve 116 fluidly communicates high pressure reservoir with low pressure reservoir when the high pressure reservoir meets or exceeds a preset elevated pressure, and safety relief valve 114 fluidly communicates lower pressure reservoir (or tire cavity of tire assembly) with atmosphere when the low pressure reservoir exceeds a high pressure set point. The safety relief valve is securely connected to the wheel rim and fluidly connects the tire cavity to atmosphere.

Figure 3:
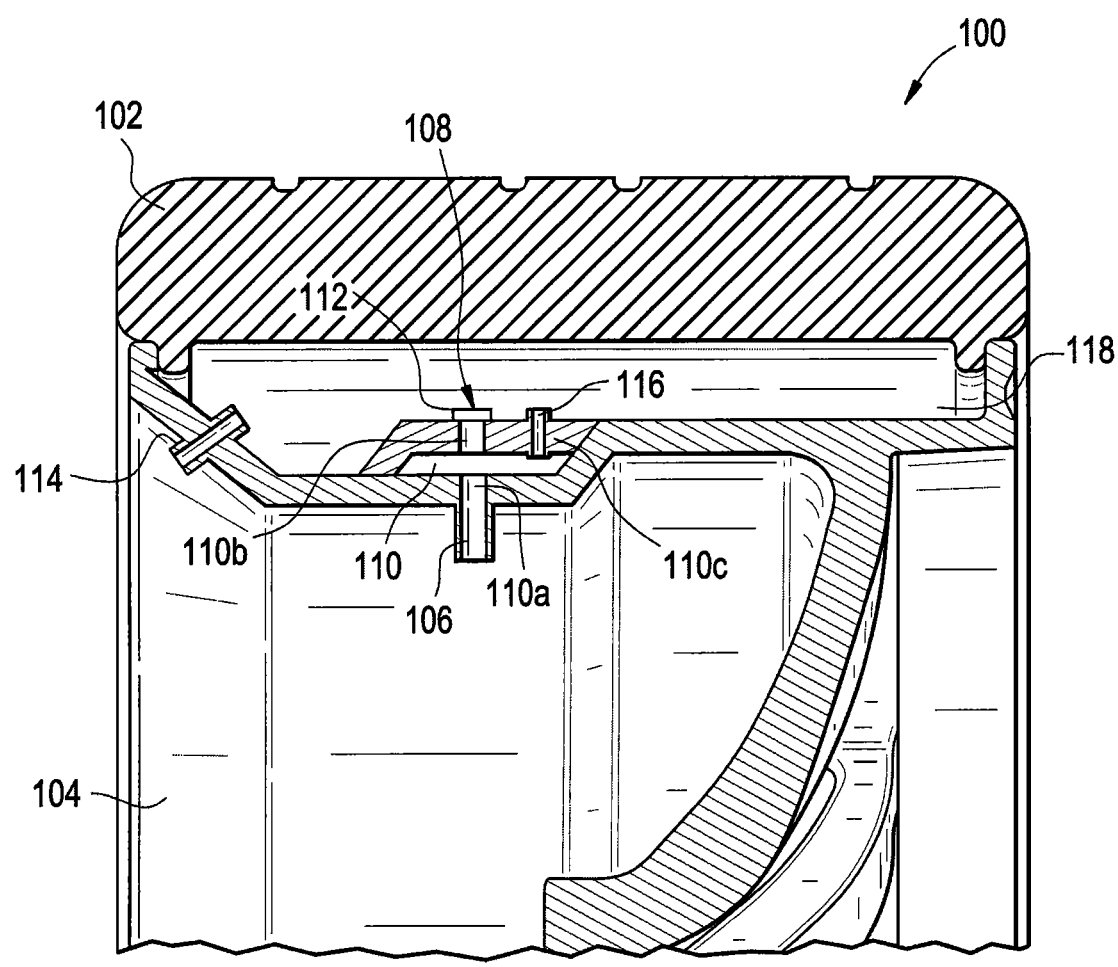
FIG. 3 is a partial cross-section of a tire assembly having an embodiment of a tire pressure maintenance apparatus and system.

FIG. 3 illustrates a partial cross-section of tire assembly 100 discussed above having an embodiment of the tire pressure maintenance apparatus and system 108. In the illustrated embodiment, tire 102 is assembled on wheel rim 104 forming a tire cavity 118 or low pressure reservoir. Tire cavity 118 is a low pressure reservoir relative to high pressure reservoir 110; i.e., there is at least some differential in pressure between tire cavity 110 and high pressure reservoir 110 when the high pressure reservoir contains a high pressure air or gas as discussed herein.

In the illustrated embodiment, tire pressure maintenance apparatus and system 108 is securely affixed or attached to wheel rim 104 inside tire cavity 118. For example, the high pressure reservoir 110 is welded, bolted, magnetically secured, etc. to an outer radial portion of the wheel rim 104.

Further, high pressure reservoir 110 includes inlet 110a, first outlet 110b, and second outlet 110c. Inlet valve 106 is securely connected to inlet 110a, pressure regulator 112 is securely connected to first outlet 110b, and high pressure relief valve 116 is securely connected to second outlet 110c. As discussed herein, a tire technician will fill the vehicle tire assembly to a specified air pressure after assembling the tire and wheel rim by filling the tire with high pressure gas via air inlet valve 106. In the illustrated embodiment, the high pressure gas enters air inlet valve 106 and fills high pressure reservoir 110 until pressure equalizes with the high pressure air/gas source, e.g., when pressure regulator 112 is not in an open position to tire cavity 118. If the pressure regulator 112 is in an open position, the high pressure gas enters the air inlet valve 106 and begins to fill high pressure reservoir 110 and the gas passes through the open pressure regulator 112 and supplies air/gas to tire cavity 118. Once an operating or high pressure set point is met or exceeded, pressure regulator 112 closes and the high pressure gas continues to fill high pressure reservoir 110 until pressure inside high pressure reservoir 110 equalizes with the high pressure air/gas source.

In the illustrated embodiment, high pressure relief valve 116 is a valve configured to prevent high pressure reservoir 110 from becoming over pressurized due to temperature changes, overfilling, and the like. For example, high pressure relief valve 116 may be configured to open at a pressure that is about 10%-20% higher than the optimum pressure point of high pressure reservoir 110. In the illustrated embodiment, high pressure relief valve 116 exhausts into tire cavity 118 and then safety relief valve 114 opens when tire cavity 118 exceeds a pressure at or above the setpoint of safety relief valve 114. In another embodiment, high pressure relief valve 116 is securely connected to a portion of the high pressure reservoir that is exposed to atmosphere, therefore the high pressure relief valve 116 exhausts directly into atmosphere (not the tire cavity).

In the illustrated embodiment, pressure regulator 112 is in-line with inlet valve 106. For example, pressure regulator 112 may be radially in-line with inlet valve 106. In another embodiment, the pressure regulator and inlet valve may be offset from one another, e.g., laterally offset, radially offset, circumferentially offset, and the like. In yet another embodiment, the inlet valve may be securely attached or connected to another location of the wheel rim 104 and securely attached or connected to another portion of the high pressure reservoir. Further in the illustrated embodiment, pressure regulator 112 is arranged so an outlet of pressure regulator 112 is perpendicular to the inlet valve 106. In another embodiment, the outlet of pressure regulator 112 is parallel with the inlet valve 106.

In the illustrated embodiment, pressure regulator 112 is a passive regulator that is preset to open when the pressure of the tire assembly, i.e., the tire cavity pressure or the low pressure reservoir, is at or below a low pressure set point. For example, for a passenger tire designed to operate at 44 p.s.i., the pressure regulator 112 may be configured to open if the operating pressure falls below a low pressure set point of 40 p.s.i., thereby releasing high pressure gas from high pressure reservoir 110 into tire cavity 118. To account for hysteresis, pressure regulator 112 may be configured for about 2-20% of the set point; for example, a pressure regulator having a set point of about 40 p.s.i. would be configured to account for about 4 p.s.i of hysteresis. High pressure is released until the tire cavity 118 pressure reaches an operating set point or operating pressure of 44 p.s.i., wherein pressure regulator 112 would transition from an open position to a closed position. This tire pressure maintenance apparatus and system 108 is passive, meaning that at least the pressure regulator operates independent of any user input after the pressure reservoir 110 is filled with high pressure gas and the low pressure set point and operating set point of pressure regulator 112 are set. In another embodiment, the low pressure set point and operating set point are selected or set at the factory or by a tire technician. In yet another embodiment, the low pressure set point and operating set point of the pressure regulator may be adjusted by a user. In another embodiment, the pressure regulator is configured to open and close based on a pressure differential relative to a set point. In another embodiment, safety relief valve and high pressure relief valve are passive.

As discussed herein, safety relief valve 114 has an inlet and an outlet that fluidly communicates the lower pressure reservoir (tire cavity of tire assembly) with the outside atmosphere when the low pressure reservoir exceeds a high pressure set point of safety relief valve 114. For example, safety relief valve 114 opens to atmosphere when the tire reservoir exceeds about 44 p.s.i. for a passenger tire. In another embodiment, the safety relief valve high pressure set point is preset at the factory or by a tire technician. In yet another embodiment, the safety relief valve high pressure set point of the pressure regulator may be adjusted by a user. Similar to the pressure regulator, the pressure relief valve is a passive valve.

In another embodiment, the safety relief valve and the pressure relief valve may be combined into one valve apparatus so that original equipment manufacturers and the like will not need special rims to incorporate the tire pressure maintenance apparatus and system discussed herein. For example, one valve may include a first portion that has a Schrader valve and a second portion that has the pressure relief valve that are both in fluid communication with the high pressure reservoir, e.g., the assembly only includes one valve that needs to be assembled in the wheel rim (not extra wheel rim holes are required). In another embodiment, a Schrader valve includes a t-portion that is securely connected to a pressure relief valve.

Figure 4A:
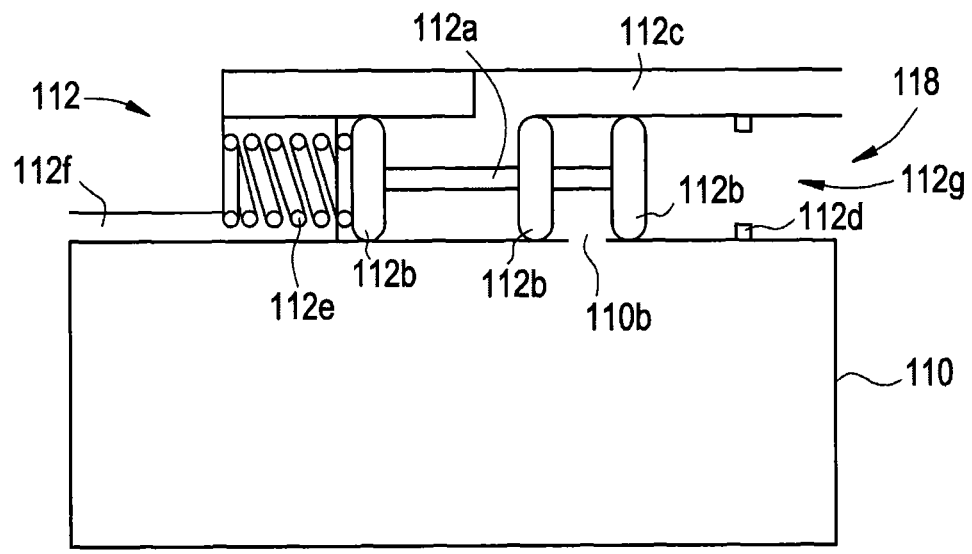
FIGS. 4A-B are schematics of an exemplary pressure regulator discussed herein and a high pressure reservoir.
Figure 4B:
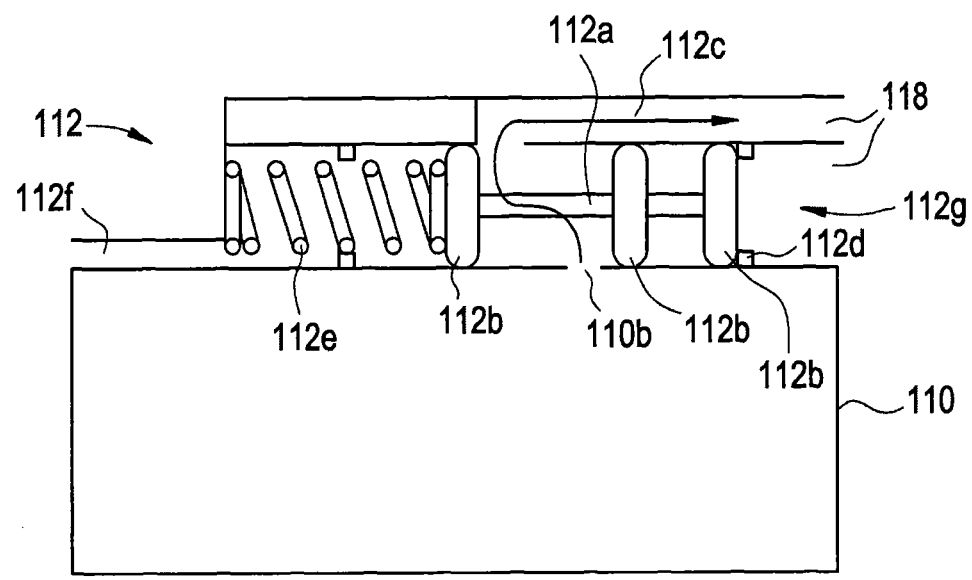

FIGS. 4A-B are schematics of an exemplary pressure regulator 112 discussed herein securely attached to a portion of high pressure reservoir 110. In the illustrated embodiments, FIG. 4A illustrates pressure regulator 112 with its valve assembly 112a in a closed position so high pressure reservoir 110 is not in fluid communication with tire cavity 118, and FIG. 4B illustrates pressure regulator 112 with its valve assembly 112a in an open position so that high pressure reservoir 110 is in fluid communication with tire cavity 118 (indicated by arrow extending from 110b to 118 through valve outlet 112c). First outlet 110b (e.g., an outlet adjacent to a valve passageway) in high pressure reservoir is not in fluid communication with tire cavity 118 when valve dampers 112b block gas from flowing from high pressure reservoir 110 into valve outlet passageway 112c (as shown in FIG. 4A). First outlet 110b of high pressure reservoir 110 is in fluid communication with tire cavity 118 when valve dampers 112b move past (or to the right of) first outlet 110b so that valve damper 112b of valve assembly 112a abuts against damper stops 112d (as shown in FIG. 4B).

In the illustrated embodiment, pressure regulator 112 includes valve assembly 112a opposed on one side by spring 112e that is fluidly connected by passageway 112f to atmospheric pressure. Spring forces of spring 112e balances the pressure from tire cavity 118 that is in fluid communication with left most damper 112b via valve outlet passageway 112c. When tire cavity 118 decreases in pressure (due to a leak, etc), the force on the spring decreases and the spring expands and moves valve assembly 112a (to the right) so that gas from high pressure reservoir 110 is in fluid communication with tire cavity 118. As the pressure in tire cavity 118 increases, the gas pressure pushes the left most damper 112b and compresses spring 112e to move valve assembly 112a (to the left) so that gas flow from high pressure reservoir 110 is not in fluid communication with tire cavity 118 (or opening 110b is less than 100% open). In another embodiment, a variable valve system may be employed, e.g., a variable flow valve system. As illustrated in the embodiments, valve outlet 112c (e.g., a passageway) and valve bore 112g (e.g., a passageway) are fluidly connected to tire cavity 118.

In the illustrated embodiment, high pressure reservoir 110 is at a first pressure P1, tire cavity 118 is at a second pressure P2, and passageway 112f or atmospheric pressure is at a third pressure P3, wherein P1>P2>P3.

FIG. 5 illustrates a partial cross-section of tire assembly 100 having another embodiment of tire pressure maintenance apparatus and system 108. The tire pressure maintenance apparatus and system is substantially the same as the tire pressure maintenance apparatus and system 108 of FIGS. 1-3, except for the differences discussed below. In the illustrated embodiment of FIG. 5, high pressure reservoir 110 is securely connected to an outer radial portion of wheel rim 104. Further, inlet valve 106 and pressure regulator 112 are securely connected to high pressure reservoir 110 and fluidly connected to each other by means of a t-connection, where the t-connection is securely connected to a lateral edge of pressure reservoir 110. In this arrangement, inlet valve 106 and outlet of pressure regulator 112 are arranged in a parallel relationship. In other words, the outlet of pressure regulator 112 and the inlet valve 106 are both perpendicular to the radial direction of wheel rim 104.

Figure 6:
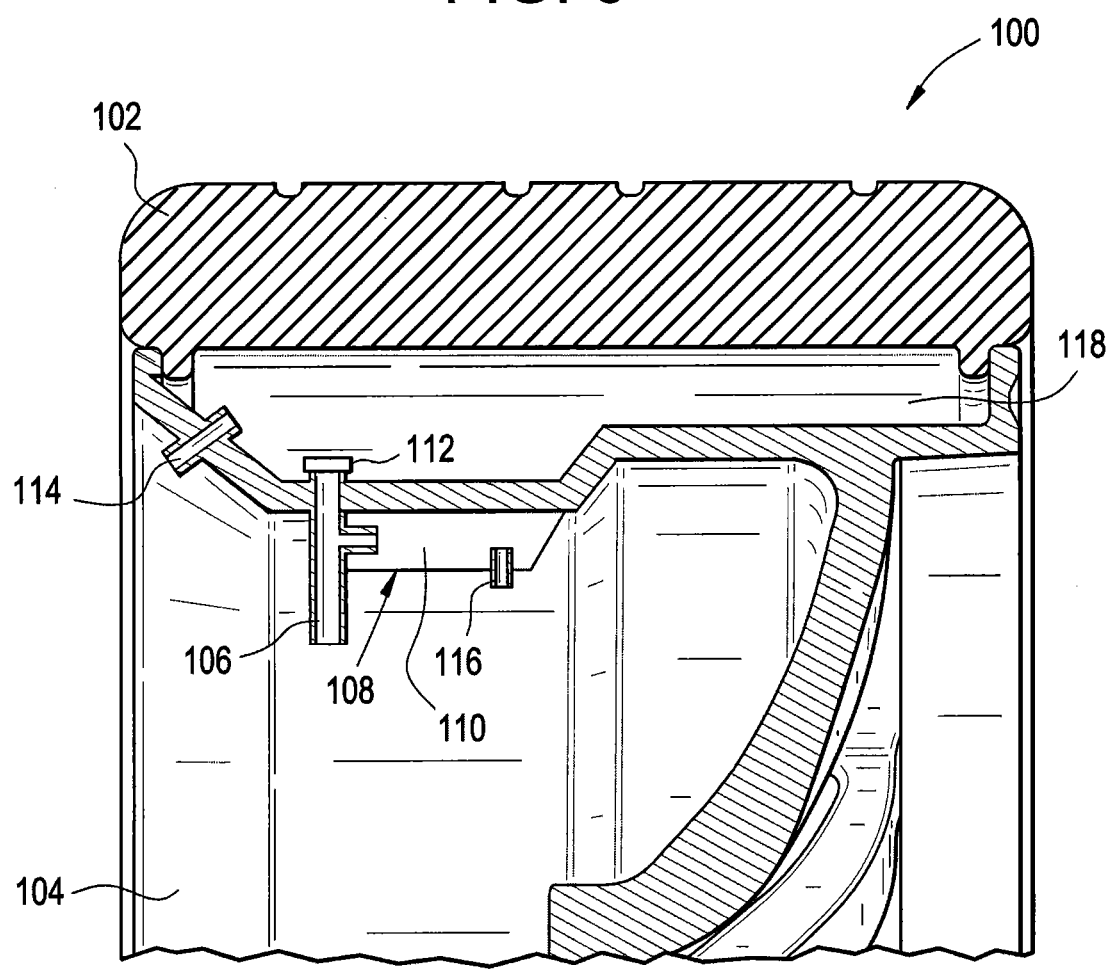
FIG. 6 is a partial cross-section of a tire assembly having yet another embodiment of a tire pressure maintenance apparatus and system.

FIG. 6 illustrates a partial cross-section of tire assembly 100 having yet another embodiment of tire pressure maintenance apparatus and system 108. The tire pressure maintenance apparatus and system is substantially the same as the tire pressure maintenance apparatus and system 108 of FIGS. 1-3, except for the differences discussed below. In the illustrated embodiment of FIG. 6, high pressure reservoir 110 is securely connected to an inner radial portion of the wheel rim 104. In the illustrated embodiment, high pressure reservoir 110 is securely connected to a curb side or inner radial portion of wheel rim 104 and is in fluid communication with pressure regulator 112 which is securely connected to an outer radial portion of wheel rim 104. Further, pressure regulator 112 is arranged so an outlet of pressure regulator 112 is perpendicular to the inlet valve 106. In the illustrated embodiment, high pressure relief valve 116 is securely connected to a portion of the high pressure reservoir that is exposed to atmosphere, therefore, the high pressure relief valve 116 exhausts directly into atmosphere (not the tire cavity). In another embodiment, a portion of the high pressure reservoir may securely attach to another portion of the wheel rim that faces the curb side of the wheel rim.

The embodiments of this invention shown in the drawings and described above are exemplary of numerous embodiments that may be made within the scope of the appended claims. It is contemplated that numerous other configurations may be created taking advantage of the disclosed approach. In short, it is the applicant's intention that the scope of the patent issuing herefrom be limited only by the scope of the appended claims.

What is claimed is:
1. An automatic tire inflation system comprising:
a high pressure reservoir;

at least one pressure regulator secured to said high pressure reservoir, said at least one pressure regulator having a passive valve in fluid communication with said high pressure reservoir;

a high pressure relief valve secured to said high pressure reservoir; and an inlet valve having a receiving end and a dispensing end, wherein said inlet valve is adapted to be in fluid communication with said high pressure reservoir, and wherein said inlet valve is in-line with said at least one pressure regulator or perpendicular with an outlet of said at least one pressure regulator.

2. The automatic tire inflation system of claim 1 further comprising a wheel rim, wherein said high pressure reservoir is secured to said wheel rim.

3. The automatic tire inflation system of claim 2, wherein said high pressure reservoir is secured to a curb side of said wheel rim.

4. The automatic tire inflation system of claim 1 further comprising a pressure relief valve.

5. The automatic tire inflation system of claim 1 further comprising a pressure relief valve, wherein said pressure relief valve has an adjustable high pressure set point.

6. The automatic tire inflation system of claim 1, wherein said pressure regulator includes a first pressure set point below which said valve of said pressure regulator passively moves to an open position and a second pressure set point at which said valve of said pressure regulator passively moves to a closed position.

7. The automatic tire inflation system of claim 1, wherein said high pressure reservoir is circumferentially continuous.

8. The automatic tire inflation system of claim 1, wherein said high pressure reservoir is a circumferentially continuous tube having a reinforced structure.

9. The automatic tire inflation system of claim 1, wherein said inlet valve is in-line with said at least one pressure regulator.

10. The automatic tire inflation system of claim 1, wherein said inlet valve is perpendicular with an outlet of said at least one pressure regulator.

11. A tire assembly comprising:
a tire;
a wheel rim connected to said tire;
a tire cavity enclosed by said tire and said wheel rim;
a high pressure reservoir secured to said wheel rim;
a pressure regulator secured to said high pressure reservoir; wherein said pressure regulator has a passive valve with a first passageway in fluid communication with said high pressure reservoir and a second passageway in fluid communication with said tire cavity, and wherein said pressure regulator has a third passageway in fluid communication with atmospheric pressure;

a high pressure relief valve secured to said high pressure reservoir; wherein said high pressure relief valve is in fluid communication with said tire cavity; and an inlet valve connected to said high pressure reservoir and connected to said wheel rim.

12. The tire assembly of claim 11, wherein said high pressure reservoir is in fluid communication with said inlet valve.

13. The tire assembly of claim 11 further comprising a safety relief valve.

14. The tire assembly of claim 11 wherein said inlet valve is in-line with said at least one pressure regulator.

15. The tire assembly of claim 11, wherein said high pressure reservoir is refillable.

16. The tire assembly of claim 11, wherein said pressure regulator includes a first pressure set point below which said valve of said pressure regulator passively moves to an open position and a second pressure set point at which said valve of said pressure regulator passively moves to a closed position.

17. The tire assembly of claim 16, wherein a high pressure gas from said high pressure reservoir moves into said tire cavity when said valve of said pressure regulator passively moves to an open position.

18. A tire assembly comprising:
a tire;
a wheel rim connected to said tire;
a tire cavity enclosed by said tire and said wheel rim;
a high pressure reservoir secured to said wheel rim;
a pressure regulator secured to said high pressure reservoir; wherein said pressure regulator has a passive valve with a first passageway in fluid communication with said high pressure reservoir and a second passageway in fluid communication with said tire cavity, and wherein said pressure regulator has a third passageway in fluid communication with atmospheric pressure;

a high pressure relief valve secured to said high pressure reservoir; wherein said high pressure relief valve is in fluid communication with said tire cavity; and an inlet valve connected to said high pressure reservoir and connected to said wheel rim, wherein said inlet valve is in-line with said at least one pressure regulator or perpendicular with an outlet of said at least one pressure regulator.

19. The tire pressure maintenance apparatus of claim 18, wherein said high pressure reservoir is refillable.

20. The tire assembly of claim 18, wherein a high pressure gas from said high pressure reservoir moves into said tire cavity when said valve of said pressure regulator passively moves to an open position.

\* \* \* \* \*